Feb. 17, 1942.                    T. G. CONCANNON                    2,273,625
                              INTERNAL COMBUSTION ENGINE
                              Filed Sept. 23, 1939           4 Sheets-Sheet 3
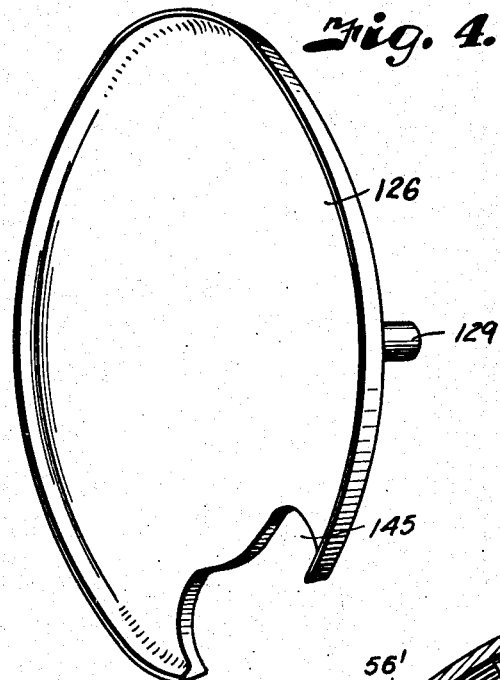
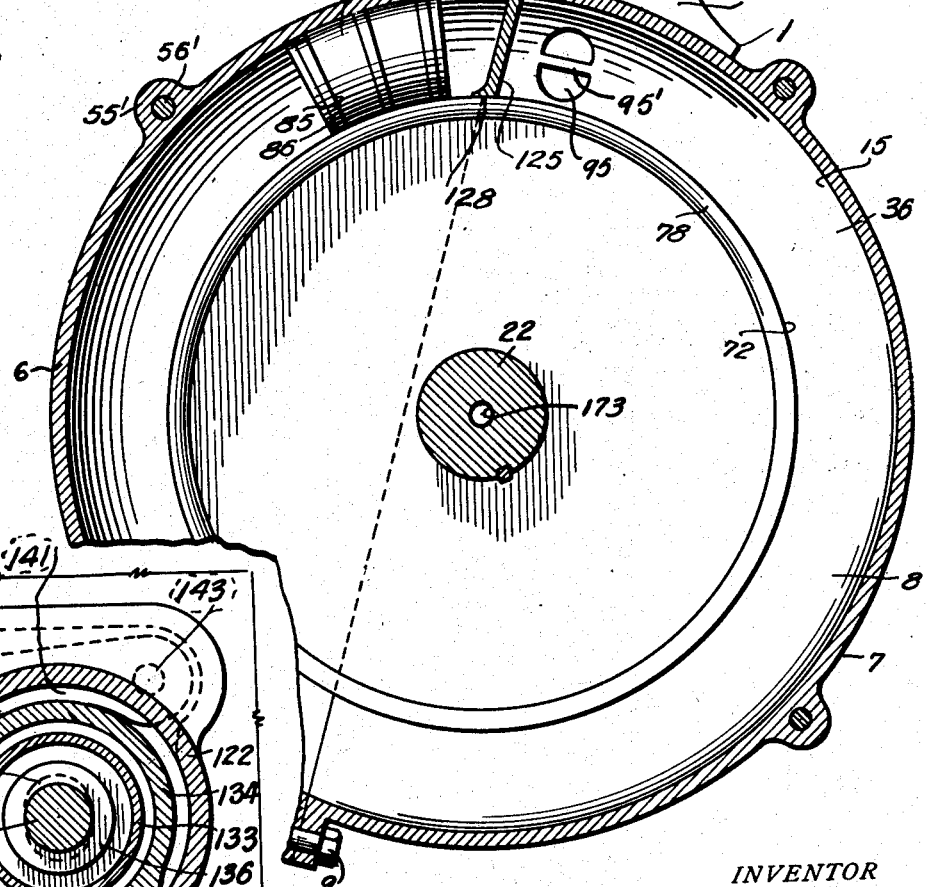
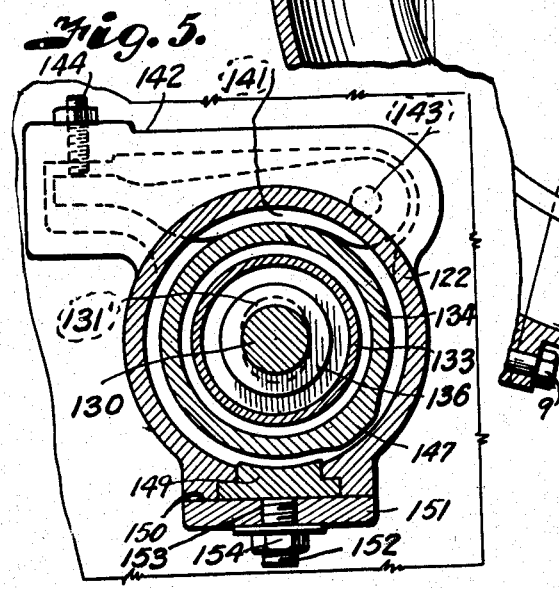
INVENTOR
Thomas G. Concannon.
BY Arthur C. Brown
ATTORNEY

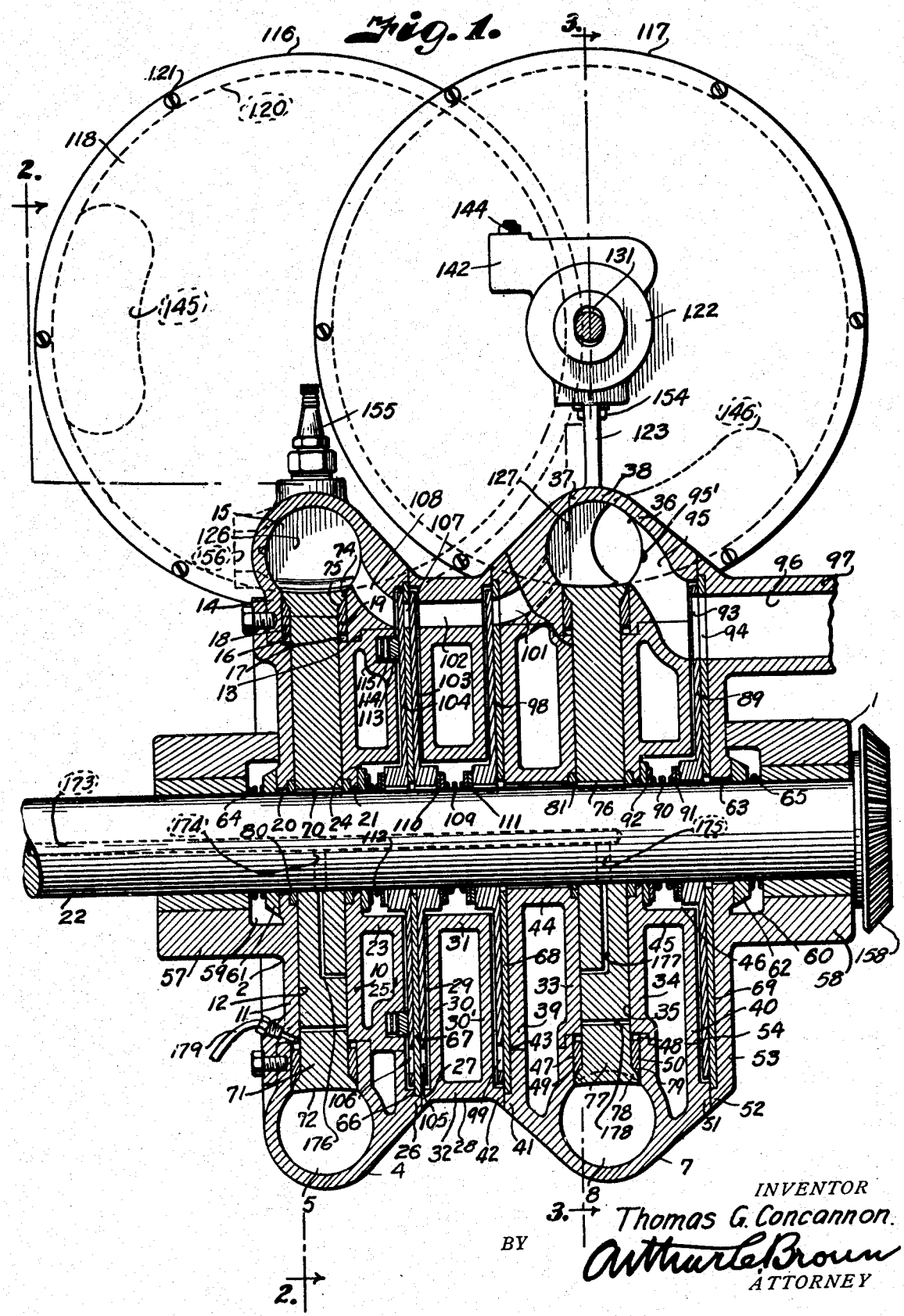

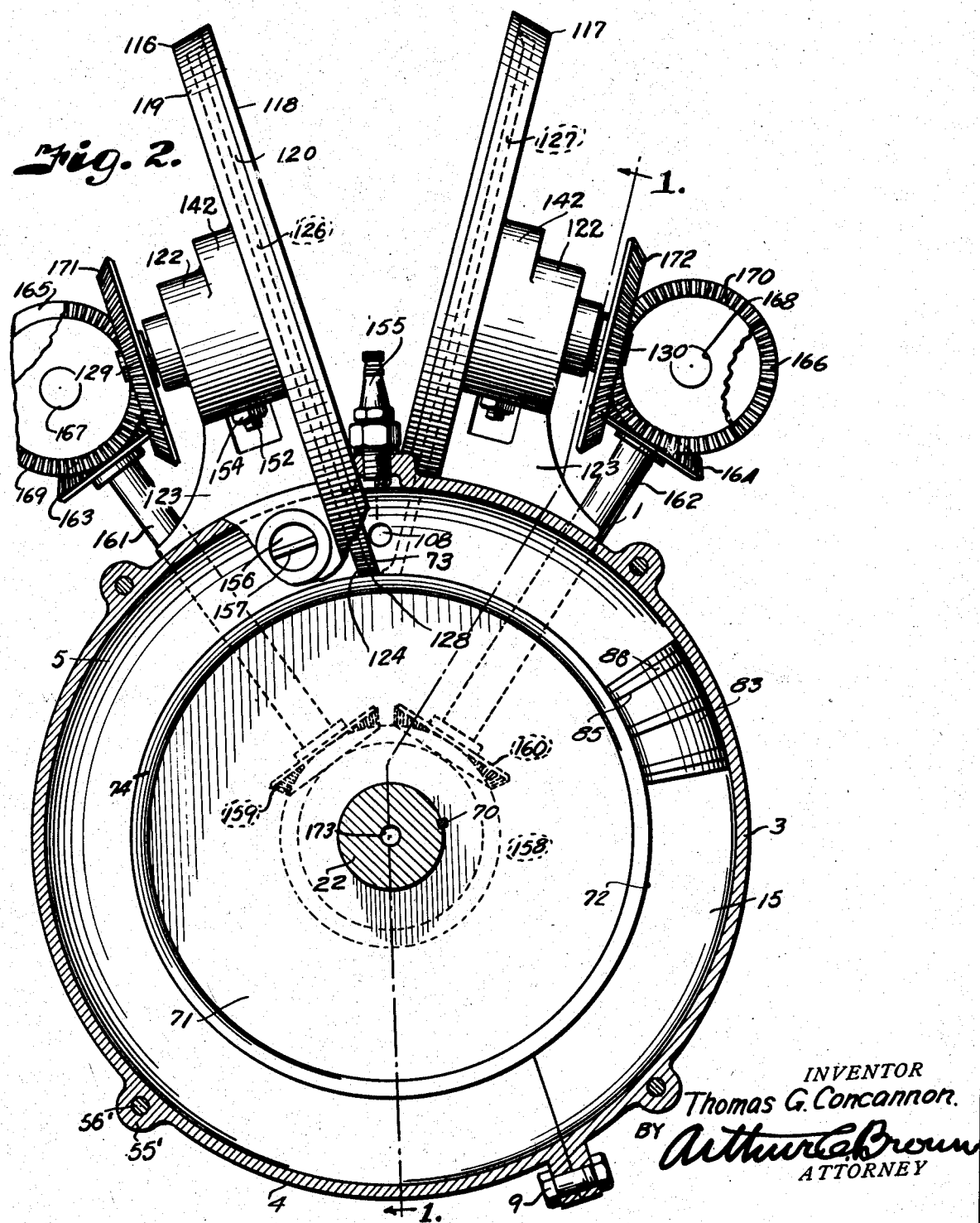

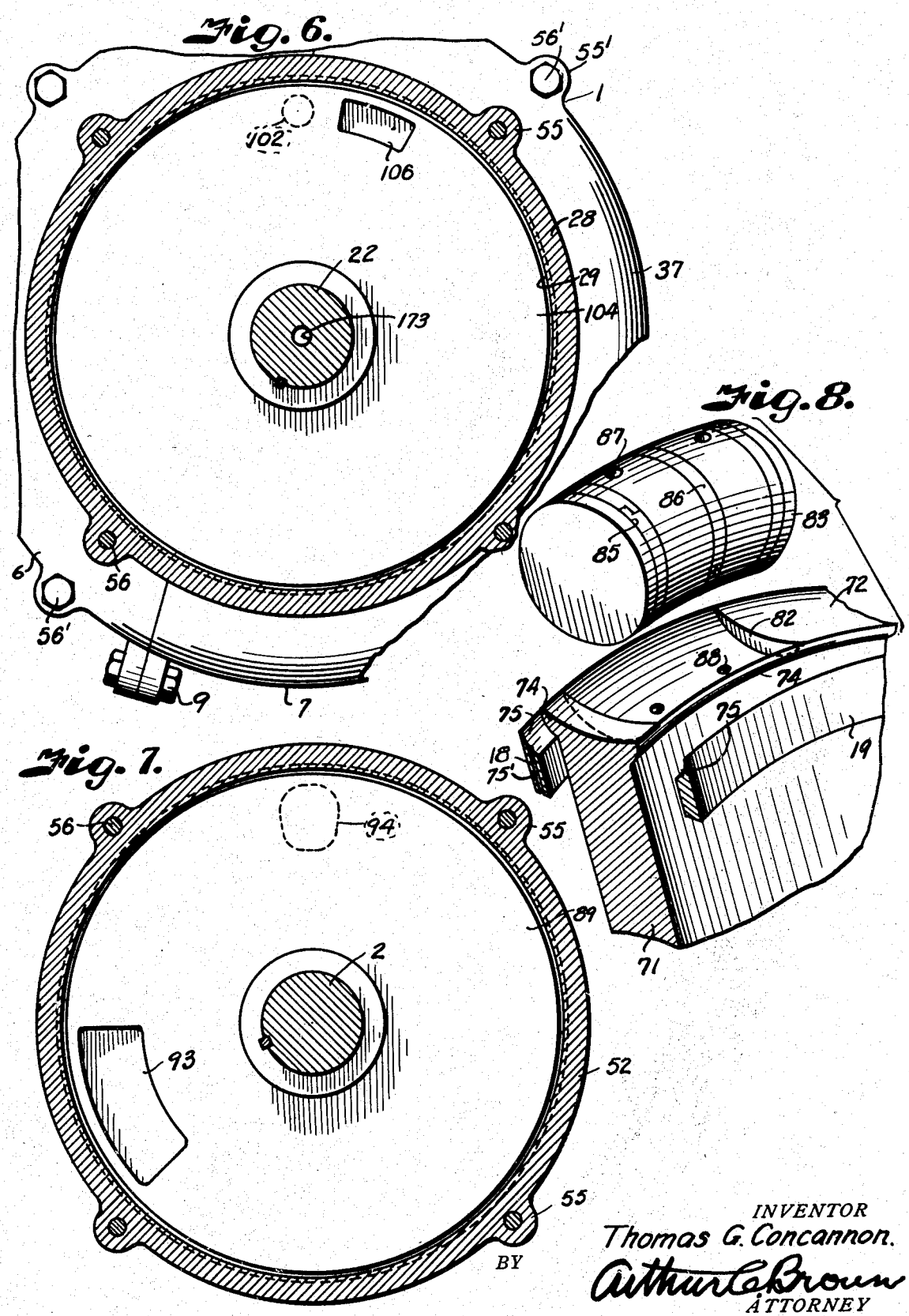

Patented Feb. 17, 1942

2,273,625

UNITED STATES PATENT OFFICE 2,273,625

INTERNAL COMBUSTION ENGINE

Thomas G. Concannon, Emporia, Kans.

Application September 23, 1939, Serial No. 296,279

13 Claims. (Cl. 123—13)

This invention relates to internal combustion engines, more particularly to those of the rotary type, and has for its principal object to provide an engine of this character that is of simple construction and capable of economic operation.

Other objects of the invention are to provide an internal-combustion engine free of reciprocatory parts; to provide a rotary engine with rotary valves; to provide a rotary engine with a directly intercoupled rotary compressor unit for supplying the power unit; to provide improved pressure sealing elements for the respective rotary parts of the engine; and to provide for pressure lubrication of the contacting surfaces and for expanding the sealing elements.

In accomplishing these and other objects of the invention, I have provided improved details of structure, the preferred form of which is illustrated in the accompanying drawings, wherein:

Fig. 1 is a longitudinal section through an engine embodying the features of the present invention, the section being taken on the line 1—1 of Fig. 2.

Fig. 2 is a vertical cross-section through the power unit of the engine on the line 2—2 of Fig. 1, with the rotary heads being shown in elevation.

Fig. 3 is a similar section through the compressor unit on the line 3—3 of Fig. 1.

Fig. 4 is a detail perspective view of one of the rotary head or cylinder division plates.

Fig. 5 is an enlarged section on the line 5—5 of Fig. 3.

Fig. 6 is a cross-section through the engine taken at a point intermediate the power and compressor units, and particularly illustrating one of the rotary fuel control valves.

Fig. 7 is a similar section illustrating the fuel inlet ports of the compression unit.

Fig. 8 is a detail perspective view, partly in section, of one of the rotors, showing the method of mounting the piston elements, the sealing rings of the rotor being shown in spaced relation.

Referring more in detail to the drawings:

1 designates a rotary engine including a housing 2 consisting of mating sections 3—4 constituting a power cylinder 5, and 6—7 constituting the compression cylinder 8. The sections 3—4 are of arcuate form and secured together by suitable fastening devices 9. 10 designates a disk-like wall which cooperates with a spaced cover plate 11 to form a rotor chamber 12. The periphery of the wall 10 has a shoulder portion 13 to engage the sections 3 and 4. The power cylinder has an annular combustion chamber 15 of torus shape and having intersection with the rotor chamber. The terminal edges of the sections 3 and 4 terminate in a flange 14 to secure the plate 11. The inner sides of the sections 3 and 4 have annular offsets 16 and 17 to receive rotor packing rings 18—19, later described.

The wall 10 and cover plate 11 have central openings 20 and 21 of suitable diameter to freely pass the power shaft 22 therethrough. Projecting from the wall 10 is an annular web 23 of larger diameter than the shaft to form an annular recess 24 for receiving packing elements later described. Connected with the web 23 is a wall 25 extending parallel with the wall portion 10. Projecting laterally from the inner face of the sections 3 and 4 is an annular rib 26 cooperating with a similar rib 27 on a connecting ring section 28 to form a valve chamber 29. The section 28 also includes spaced wall portions 30 and 30' connected by an axial web 31, similar to the web 23, and their outer peripheries are connected by a circular web 32, the wall 30 cooperating with the wall 25 to form the side walls of the valve chamber.

The sections 6 and 7 have spaced, disk-like walls 33 and 34 set therein to form a rotor chamber 35 therebetween, and which terminates at the periphery in an annular piston chamber 36 in the sections 6 and 7 which is also of torus shape. Connected with the wall portions 33 and 34 are disk-like walls 39 and 40, as shown in Fig. 1. The inner edge of the sections 6 and 7 has an annular rib 41 cooperating with a similar rib 42 on the wall 30' of the section 28 to form a valve chamber 43. The walls 33 and 39 are interconnected by a hub portion 44 of slightly larger diameter than the shaft. The wall 34 is likewise connected with the wall 40 by a hub portion 45 conforming in diameter to the hub portions 23 and 31 previously described, and which is of sufficiently large diameter to form a packing retaining chamber 46. The rotor chamber also has spaced annular shoulders 47 and 48 to receive rotor packing rings 49 and 50. The outer periphery of the sections 6 and 7 also has a laterally extending annular rib 51, cooperating with a similar rib 52 on a closure plate 53 to form an inlet valve chamber 54. The compression and motor sections are connected with the ring section 28 by cap screws 55 extended through ears 56. The motor and compression sections may be additionally connected by draw bolts 55' extending through ears 56'.

Carried by the cover plates 11 and 53 are bearings 57 and 58 to rotatably journal the power shaft 22. The inner sides of the bearings are recessed, as at 59 and 60, to accommodate sealing rings 61 and 62 that are pressed into sealing contact about the opening 20 of the wall 10 and a similar opening 63 in the plate 53 by coil springs 64 and 65, the coil springs being sleeved over the power shaft.

Formed in the ribs 26, 41 and 52 are annular shoulders 66, of larger diameter than the valve chambers, to seat diaphragms 67, 68 and 69 respectively that have their perimetrical edges clamped by the annular ribs of abutting sections so that they are rigidly retained in coaxial alignment with the respective sections of the housing.

Fixed on the shaft 22 by a spline 70 is a disklike rotor 71, having an annular face 72 cooperating to form the inner side of the piston or combustion chamber 15, the face being concave on the arc of a circle corresponding to the radius of a rotary back valve later described. The rotor 71 is of sufficient width to be freely rotatable between the wall 10 and cover plate 11, and has laterally extending tapered flanges 74 on the sides thereof to sealingly engage with bevelled and slightly rounded annular faces 75 of the sealing rings 18 and 19 so as to prevent leakage from the combustion chamber into the rotor chamber. Fixed on the shaft within the rotor chamber 35, by a spline 76, is a similar disk-like rotor 77 and which has laterally extending, inwardly bevelled flanges 78 sealingly engaged by oppositely bevelled faces 79 on sealing rings 49 and 50 previously mentioned. The power shaft is sealed with respect to the openings in the rotors by rings 80 and 81 respectively, as best shown in Fig. 1.

Formed in the concave periphery of each rotor, at related points therein, are sockets or seats 82 to receive pistons 83 and 84 respectively, the pistons having cross-sections corresponding to the cross-sections of the respective piston chambers. The pistons have their peripheries grooved, as at 85, to receive piston rings 86 sealingly engaging the walls of the piston chambers. The pistons are retained in their seats by suitable fastening devices extending through openings 87 in the pistons and into threaded sockets 88 of the rotors, see Fig. 8.

Slidably splined on the shaft, within the valve chamber 54, is a disk-valve 89 that is retained in rotary contact with the diaphragm 69 by a spring 90, coiled about the shaft and having its ends bearing against packing ring assemblies 91 and 92 sealingly engaging the hub of the valve disk and the bottom of the recess 46 respectively. The valve plate is provided in the periphery thereof with a port 93 arranged to interconnect a fuel inlet port 94 formed in the diaphragm 69, with a passageway 95 provided in the section 7 and opening into the piston chamber 36 through a port 95 having a bar 95' thereacross to prevent catching of the piston rings. The port 94 registers with a port 96 in a carburetor connection 97, whereby a carbureted mixture is delivered to the compression chamber 36.

Slidably keyed to the shaft 22 and rotatable in the valve chamber 43 is a similar disk valve 98 rotatably engaging the diaphragm plate 68, and which has a port opening 99 therein adapted to interconnect a discharge port 101 in the section 6 with a transfer port 102 extending through the housing section 28 into the valve chamber 29.

The valve chamber 29 is divided in two parts by the diaphragm 67 and rotatable in the respective parts thereof, in contact with the respective sides of the diaphragm, are valve disks 103 and 104, having ports 105 and 106 therein adapted to register with the port 102 and an aligning port 107 in the diaphragm 67 and a passageway 108 leading into the combustion chamber 15. The valve disks 103 and 98 are yieldingly retained in rotary engagement with the respective diaphragms 67 and 68 by a coil spring 109, having its ends supportingly engaging packing ring assemblies 110 and 111, which bear against the hubs of the respective disks. The disk 104 is yieldingly retained against the diaphragm 67 by a similar coil spring 112, bearing against similar packing rings respectively engaging against the hub of the disk and against the wall 10, as clearly shown in Fig. 1. The last named valve disk is also sealingly engaged by a ring 113 received in an annular groove 114 and pressed in sealing contact with the disk by a spring element 115 engaged in the bottom of the groove.

Carried by the motor and compressor sections are transversely arranged abutment valve housings 116 and 117 respectively, each including spaced plate portions 118 and 119 arranged at an angle with respect to a vertical plane extending through the axis of the shaft 22, and having the axes thereof located in planes extending through the vertical centers of the respective piston cylinders, as best shown in Figs. 1 and 2. One of the plate portions of each housing is provided with a peripheral flange 120 to which the other plate portion is connected by suitable fastening devices 121 (Fig. 1). The flanges 120 preferably have grooves 120' fitting annular ribs 120" on the plates 118 that press against gaskets inset within the grooves, the ribs being sufficiently short to allow metal seating of the plates 118 against the faces of the flanges 120 when the fastening devices 121 are tightened. The plate portions 119 have axial bearing casings 122 on their outer sides that are integrally connected with the sections 4 and 7 by brackets 123 (Fig. 2). The other plate portions 118 are respectively carried by, and formed integrally with, the sections 3 and 6 respectively. The axes of the plate portions are arranged so that the chambers formed therebetween intersect the respective piston chambers through slots 124 and 125 respectively.

Rotatably mounted in the respective valve chambers are disk-type abutment valves 126 and 127 respectively, having their peripheries 128 contacting the concave faces of the respective rotors. The contacting faces are preferably of greater width than the body portion of the disk as shown in Fig. 3. The disks are fixed on shafts 129 and 130 having floating mounting in the bearing casings of the respective brackets, so that the disks are adapted to move to and from face contact with the rotors but are retained from lateral movement. The shafts 129 and 130 therefore extend through elongated openings 131 and 131' of the bearing casings (Fig. 3), and are yieldingly retained in rotary contact with the plates 119 by coil springs 132 bearing against cups 133, which in turn bear against reversely arranged cups 134 forming bearings for the shafts. The valve disks therefore are retained in yielding contact with their respective housings to prevent leakage about the slots 124 and 135 on the compression sides of the respective piston chambers. The openings 131 and the shaft openings 135 in the cups 133 are sealed by packing rings 136 and 137 which are retained in packing position by springs 138. The openings 131' are similarly sealed by packing rings 139 seated by springs 140.

In order to exert yielding pressure of the peripheries of the disks upon the rotors, the outer cups 134 are acted upon by levers 141 pivotally mounted within extensions 142 of the bearing casings on pins 143. The free ends of the levers extend over the tops of the cups and are yieldingly pressed thereagainst by adjustable spring tension devices 144. In order that the pistons will pass the respective disks, the disks are provided with slot-like openings 145 and 146 respectively, the slots being of sufficient length to allow time for the pistons to pass the disk locations. Since the slots are wider than the rotors, it is necessary to provide means for supporting the disks while the portions of the disks having the slots are moving across the piston chambers. This is effected by cam-like lugs 147 on the outer cup 134 which engages an adjustable plate 149 mounted to slide on the inclined surfaces 150 of closure plates 151 carried by the lower portions of the bearing casings. The wedge-like plates carry studs 152 which project through slotted openings 153 in the plates and are provided with nuts 154 which, when clamped thereagainst, are adapted to retain the adjusting plates in adjusted position.

Located in the wall of the piston chamber, adjacent the fuel inlet port, is a spark-plug 155. Formed in the side wall of the section 4, at the rear side of the abutment valve for the power unit, is an exhaust port 156 having a bridge bar 157 extending thereacross to prevent catching of the piston rings as the piston passes the port.

The abutment valves are operated in timed relation with the rotors through a driving connection which is diagrammatically illustrated in Fig. 2. The driving connections include a gear 158 fixed to the shaft 22 which meshes with bevelled gears 159 and 160 on the ends of radially directed shafts 161 and 162. Fixed to the outer ends of the shafts 161 and 162 are gears 163 and 164 meshing with bevelled gears 165 and 166 on countershafts 167 and 168 which extend horizontally in parallel relation with the shaft 22 and in plane with the axes of the shafts 129 and 130 respectively. The shafts 167 and 168 also carry gears 169 and 170 meshing with gears 171 and 172 on the shafts 129 and 130 respectively (Fig. 2).

The sliding surfaces of the rotors with the walls of their respective chambers and the moving surfaces of the packing rings 18—19 and 49—50 are lubricated through a bore 173 in the power shaft 22 and lateral ports 174 and 175 located in alignment with the respective rotors. The rotors are provided with oil passageways 176 and 177 to fill the vacant spaces between the side walls of the rotor chambers. The rotors are also provided with cross-ports 178 located directly below the sealing ring so as to equalize the oil pressure on the respective sides of the rotors. The oil escapes outwardly between the sides of the rotor and rotor chamber to collect in the space under the packing rings, the oil exerting sufficient pressure to hold the edges of the rings in sealing contact with the bevelled flanges of the rotors. The oil is supplied to the contact surfaces of the rotor flanges 74 and ring faces 75 through radial bores 75' (see Fig. 8). Oil may be supplied in front of the foremost piston rings 86 through ports (not shown) having connection with the passageways 176 so as to lubricate the walls of the cylinders. The oil escapes through lead-off pipes 179 and is recirculated. The lead-off pipes 179 are preferably provided with suitable pressure control valves for maintaining the required pressure on the packing rings. The lubricating oil thus not only supplies the required lubricant for maintaining the engine at proper temperature, but is also used to effect expansion of the packing rings.

Assuming that the engine is constructed and assembled as described, the operation is as follows:

When the shaft 22 is rotated the engine and compressor rotors, as well as the valves 89, 98, 103 and 104, rotate as a unit, with the power and compressor abutment valves being timed in proper sequence relative to the rotors so that the slot-like openings 145 and 146 of the respective power and compressor abutment valves are in position to permit passage of the pistons. The valves 89, 98, 103 and 104 are arranged on the shaft 22 so that the ports therein register with the fuel passageways at the proper time. When the compression piston 84 passes the port 95, the port 93 registers with the port 96 leading to the carburetor. At this time the valve 127 is moving in position to close off the compression chamber on the retractive side of the compression piston, so that a fuel charge is drawn into the compression chamber. Simultaneously with this action, the head of the piston is compressing a previously indrawn charge against the valve 127. When the piston 84 approaches the valve, the port 99 in the valve 98 is in position to connect the ports 101 and 102. At this time the ports 105 and 106 in the valves 103 and 104 are also in registry with the port 107, so that the fuel charge compressed between the head of the piston and the front plate is discharged through the port 101, valve port 99, ports 102, 105, 107 and 106, through the passageway 108, and into the combustion cylinder. After transfer of the fuel charge and subsequent closing of the ports 107, 102 and 101 by the valves 98, 103, and 104, the slot-like opening 146 begins to register with the compression chamber, and by the time the piston reaches the point of the compressor abutment valve, the slot-like opening is in full registry to permit passage of the compression piston 84. After passage of the piston, the notch is moved out of registry so that the valve is again effective in closing off the compression chamber. At the time a fuel charge is moved through the passage 108, the power abutment valve 126 is closing the combustion chamber on the retractive side of the port, and the retractive side of the piston 83 is passing or has just passed the passageway 108 so that the compressed fuel charge is trapped between the power abutment valve and the retractive end of the piston. By this time the valves 104, 103 and 98 have closed off communication with the compressor unit. The trapped charge is then ignited upon passing of a spark across the terminals of the spark-plug 155 to effect combustion of the fuel. The burning fuel acts against the retractive head of the piston 83 and effects movement of the rotor 71. The piston 83 is now moving through the combustion chamber and a previously burnt charge is expelled by the head of the piston through the exhaust port 156. As the head of the piston approaches the power abutment valve, the slot-like opening 145 thereof registers with the combustion chamber so that the piston passes therethrough. Immediately upon passing of the piston, the power abutment valve is effective in closing the combustion chamber, completing one cycle of operation. The subsequent cycles operate the power piston in like manner to continue operation of the power shaft so that the engine continues under its own power. Power generated by the engine may be taken from the shaft 22 by any suitable driving connection (not shown).

From the foregoing it is apparent that I have provided an internal combustion engine free of reciprocatory parts, and that all the moving elements rotate continuously in the same direction thereby providing smooth flow of power. The long power stroke of the piston is effective in obtaining maximum expansion of the combusted fuel so that the engine is economical in operation. A power impulse is also effected for each revolution of the power shaft and the spent gases are exhausted without waste or diluting of a new charge, thereby giving the advantages of a two-cycle engine without customary difficulties in scavenging previous fuel charges.

While I have illustrated and described only a single motor and compressor unit, it is obvious that additional units may be provided without departing from the spirit of the invention.

It is obvious that the valve mechanism, gears, and other moving parts, may operate in lubricant under pressure by providing the shaft with additional oil outlets into the valve chambers.

What I claim and desire to secure by Letters Patent is:

1. In a device of the character described, an annular chamber, a piston in the chamber, a rotor mounting the piston, a disk valve having a piston passageway therein, means movably and rotatably supporting the disk valve in a plane offset in the direction of rotor rotation from a parallel plane extending through the longitudinal axis of the rotor with the peripheral edge thereof in sealing contact with the rotor and with the axis of rotation at right angles with respect to the axis of the rotor, means yieldedly urging the disk valve in the direction of the rotor to maintain said sealing contact, and means rotating the disk valve in timed relation with the rotor.

2. A device of the character described including an annular chamber, a piston in the chamber, a rotor mounting the piston for movement through the chamber, a circular valve having a notch-like opening in the edge thereof, means mounting the valve for rotation transversely of and in a plane offset from the axis of rotation of said rotor, means acting longitudinally of the valve axis for yieldingly retaining the peripheral edge of the valve in contact with the rotor, means supporting said valve when the portion having said notch-like opening is moving across the rotor, and means for operating the valve in timed relation with the rotor, said peripheral edge of the valve being in contact with the rotor across the entire width of the valve.

3. In a device of the character described, an annular chamber, a rotor chamber intersecting said annular chamber, a piston in the annular chamber, a rotor in the rotor chamber mounting the piston for movement through the annular chamber and having outwardly tapering peripheral flanges closing the annular chamber from the rotor chamber, packing rings inset into annular recesses of a motor chamber on the respective sides of the rotor and having wedge-like peripheries engaging the tapered portions of the flanges for sealing the rotor with the annular chamber, and means supplying a fluid pressure medium against said rings to enhance seating contact of said wedge-like peripheries with the tapered portions of said flanges.

4. In a device of the character described, a housing having an annular chamber and a slot extending transversely of said chamber offset from a plane passing through the axis of said annular chamber, a piston in the chamber, a rotor mounting the piston for movement through the chamber, a disk-like valve having a slot-like opening in the edge thereof, means mounting the disk-like valve for rotation through said slot-like opening in the annular chamber about an axis transversely of the rotor, means acting in the axial direction of said disk-like valve for yieldingly retaining the edge of the disk-like valve in sealing contact with the rotor, and means for operating the disk-like valve in timed relation with the rotor.

5. In a device of the character described, an annular chamber, a piston in the chamber, a rotor mounting the piston for movement through the chamber, a disk-like valve having a slot-like opening in the edge thereof, means mounting the disk-like valve for rotation transversely of the axis of rotation of said rotor, means yieldingly retaining the peripheral edge of the disk-like valve in sealing contact with the rotor in the plane of said disk-like valve and offset from a parallel plane extending through the rotational axis of the rotor, supporting means for said disk-like valve while the slot-like opening thereof is passing across the rotor, and means for operating the disk-like valve in timed relation with the rotor.

6. An engine of the character described including a housing having an annular combustion chamber, a transversely arranged power abutment valve housing having intersection with the combustion chamber and located at a point offset from a plane extending through the axis of the combustion chamber on the side opposite to the direction of rotation with respect to said valve housing, a power abutment valve, means rotatably supporting the power abutment valve in rotary contact with said power valve housing, a piston in the combustion chamber, a rotor supporting the piston, and means in the power abutment valve housing for yieldingly shifting the power abutment valve in the direction of said plane for retaining the power abutment valve in sealing contact with the rotor, said power abutment valve having an opening in the periphery for passing the piston.

7. An engine of the character described including a housing having an annular compression chamber, a transversely arranged compressor abutment valve housing having intersection with the compression chamber and located at a point offset from a plane extending through the axis of the compression chamber, a compression abutment valve, means rotatably supporting the compression abutment valve in rotary contact with said valve housing, a piston in the compression chamber, a rotor supporting the piston, and means in the compression abutment valve housing for yieldingly shifting the compression abutment valve in the direction of said plane for retaining the compression abutment valve in sealing contact with the rotor, said compression abutment valve having an opening in the periphery for passing the piston.

8. An engine of the character described including a housing having an annular chamber, a disk-like valve intersecting the annular chamber, a shaft for the valve, a cup-like member fixed to said shaft, yielding means supporting said cup-like member, and cam means on said cup-like member for supporting said valve against yielding movement during a portion of rotation of said valve.

9. An engine of the character described including a housing having an annular chamber, a disk-like valve intersecting the annular chamber, a shaft for the valve, a cup-like member fixed to said shaft, yielding means supporting said cup-like member, cam means on said cup-like member for supporting said valve against yielding movement during a portion of rotation of said valve, and wedge means engageable with the cam means.

10. In an engine of the character described, a housing having annular combustion and compression chambers, means supplying a fuel to the compression chamber, fuel transfer means connecting the compression and combustion chambers including a diaphragm having fixed support in the housing and provided with a port, a shaft supported in the axis of said chambers and extending through the diaphragm, rotors on the shaft, a piston in each chamber having connection with one of the rotors, valve disks slidably keyed on said shaft and engaging the respective sides of said diaphragm to control fuel transfer through said port, and springs for retaining said disks in sealing contact with the diaphragm.

11. In an engine of the character described, a housing having annular combustion and compression chambers, means supplying a fuel to the compression chamber, fuel transfer means connecting the compression and combustion chambers including a diaphragm having fixed support in the housing and provided with a port, a shaft supported in the axis of said chambers and extending through the diaphragm, rotors on the shaft, a piston in each chamber having connection with one of the rotors, valve disks slidably keyed on said shaft and engaging the respective sides of said diaphragm to control fuel transfer through said port, springs for retaining said disks in sealing contact with the diaphragm, and a sealing ring carried in the housing and having sealing contact with the disk adjacent the combustion chamber.

12. In a device of the character described, an annular chamber, a rotor chamber intersecting said annular chamber, a piston in the annular chamber, a rotor in the rotor chamber mounting the piston for movement through the annular chamber and having outwardly tapering peripheral flanges closing the annular chamber from the rotor chamber, packing rings inset into annular recesses of the rotor chamber on the respective sides of the rotor and having wedge-like peripheries engaging the tapering portions of the flanges for sealing the rotor with the annular chamber, and means for supplying a lubricant to said recesses for acting against said packing rings to enhance sealing contact of said wedge-like peripheries with the tapered portions of said flanges and to provide lubrication for the surfaces in said sealing contact.

13. A device of the character described including, an annular chamber, a piston in the chamber, a rotor mounting the piston for movement through the chamber, a circular valve having a notch-like opening in the edge thereof, means mounting the valve for rotation transversely of and in a plane offset from the axis of rotation of said rotor, means acting longitudinally of the valve axis for yieldingly retaining the peripheral edge of the valve in contact with the rotor, means supporting said valve when the portion having said notch-like opening is moving across the rotor, and means for operating the valve in timed relation with the rotor.

THOMAS G. CONCANNON.